United States Patent [19]
Nakajima et al.

[11] Patent Number: 5,467,339
[45] Date of Patent: Nov. 14, 1995

[54] OPTICAL DISC HAVING INFORMATION UNITS COMPRISING A PLURALITY OF SEPARATED PIT PIECES, AND PLAYBACK APPARATUS AND RECORDING AND PLAYBACK METHOD THEREFOR

[75] Inventors: Hiroyuki Nakajima; Makoto Satoh, both of Tokorozawa, Japan

[73] Assignee: Pioneer Electronic Corporation, Tokyo, Japan

[21] Appl. No.: 269,115

[22] Filed: Jun. 30, 1994

[30] Foreign Application Priority Data

Jul. 5, 1993 [JP] Japan ..................... 5-165422

[51] Int. Cl.⁶ ..................................... G11B 3/70
[52] U.S. Cl. ..................... 369/275.4; 369/275.3
[58] Field of Search ................ 369/275.4, 275.3, 369/275.1, 275.2, 272, 273, 274

[56] References Cited

U.S. PATENT DOCUMENTS 5,331,623  7/1994  Matoba et al. ................. 369/275.4
5,337,301  8/1994  Sugiura et al. ................. 369/275.4
5,357,499  10/1994  Nomoto ........................ 369/275.4
5,359,591  10/1994  Nomoto ........................ 369/275.4

Primary Examiner—Georgia Y. Epps
Assistant Examiner—Tan Dinh
Attorney, Agent, or Firm—Young & Thompson

[57] ABSTRACT

An optical disc is provided with: a disc substrate having a disc shape; a recording surface formed on the disc substrate and having a spiral or coaxial track with a predetermined track pitch; a plurality of information units formed on the track, each of which has a predetermined unit length in a circumferential direction and a radial direction of the optical disc respectively; and a pit formed in each of the information units, for recording information by converting the information in a shape of the pit, the pit having one of a plurality of shapes comprising a combination of presence and absence of 4 pit pieces, each of the pit pieces being separated from each other and disposed outside of an area, which is approximately shaped in a X letter in the information unit and includes a unit center of the information unit.

10 Claims, 12 Drawing Sheets

OPTICAL DISC HAVING INFORMATION UNITS COMPRISING A PLURALITY OF SEPARATED PIT PIECES, AND PLAYBACK APPARATUS AND RECORDING AND PLAYBACK METHOD THEREFOR

BACKGROUND OF THE INVENTION

1. Field of the Invention

The present invention relates to an optical disc, an apparatus for reproducing the same and a method of recording and reproducing the same.

2. Description of the Related Art

There is an optical disc for recording and reproducing audio information and video information. The principle of recording and reproducing operation of such an optical disc is explained with referring to FIG. 11.

In FIG. 11, upon recording audio information and/or video information onto an optical disc 92, the information is converted to a pit length and an inter space between information pits 91 on an information recording surface 95 of the optical disc 92, to be recorded. On the other hand, upon reproducing the audio and/or video information from the optical disc 92, a laser beam having a laser beam spot LS with a predetermined diameter is irradiated onto the information pits 91, and the reflected and diffracted light is detected by a light detecting device composed of a photodiode etc., to convert it to an electrical signal. Then, a signal conversion reverse to that applied at the time of recording is applied to the electrical signal and the audio and/or video information is reproduced.

As an optical disc used in this manner, there are a compact disc (CD), a laser vision disc (LVD) and so on. In FIG. 11, a reference numeral 93 represents a substrate composed of polycarbonate resin etc., and a reference numeral 94 represents a protection layer.

The information recording density of this kind of optical disc, is greatly influenced by the value of a track pitch P1 shown in FIG. 12, and the value of the diameter of the laser beam spot LS. In order to record more information on an optical disc, it may be tried to reduce the track pitch or reduce the diameter of the laser beam spot LS. However, a practically successful result of such a trail is not reported, so far.

As mentioned above, since it is rather difficult to increase the information recording density by reducing the track pitch or reducing the laser beam spot, it may be proposed a method to increase the information recording density by irradiating a laser beam onto a pit which has a plurality of different shapes, and reading the distribution of the reflected and diffracted light from the pit by a photodetector. This method aims at increasing the information recording density by increasing the information amount per one pit, from one bit (i.e. the presence and absence of the pit) to n bits. However, this method has a problem that the shape of the pit cannot be correctly detected often due to the influence of the shapes of the pits in the vicinity of the pit to be read, and the influence of the offset or shift between the center of the information unit and the center of the laser beam spot.

SUMMARY OF THE INVENTION

It is therefore an object of the present invention to provide an optical disc, an apparatus for reproducing the optical disc, and a method of recording and reproducing the optical disc, which can reduce the possibility to erroneously detect the shape of the pit in case of increasing the information recording density by use of the pits having a plurality of different shapes.

The above object of the present invention can be achieved by an optical disc provided with: a disc substrate having a disc shape; a recording surface formed on the disc substrate and having a spiral or coaxial track with a predetermined track pitch; a plurality of information units formed on the track, each of which has a predetermined unit length in a circumferential direction and a radial direction of the optical disc respectively; and a pit formed in each of the information units, for recording information by converting the information in a shape of the pit, the pit having one of a plurality of shapes comprising a combination of presence and absence of 4 pit pieces, each of the pit pieces being separated from each other and disposed outside of an area, which is approximately shaped in a X letter in the information unit and includes a unit center of the information unit.

According to the optical disc of the present invention, a plurality of information units are formed on a track of the optical disc. Each of the information units has a predetermined unit length in a circumferential direction and a radial direction of the optical disc, respectively. The information is recorded by converting the information in a shape of a pit formed in the information unit. The pit has one of a plurality of shapes comprising a combination of presence and absence of 4 pit pieces. Each of the pit pieces is disposed in such a condition that the pit pieces are separated from each other and disposed outside of an area, which is approximately shaped in a X letter in the information unit and includes a unit center of the information unit. Therefore, the pit can express 16 different kinds of information (i.e. corresponding to 4 bits), by use of the combination of the presence and absence of the 4 pit pieces. Further, since each of the pit pieces is disposed in such a condition that the pit pieces are separated from each other and disposed outside of the X letter shaped area, the possibility to erroneously detect the pit shape can be diminished even if the center of the information unit and the center of the reproducing light spot is shifted from each other.

The above mentioned object of the present invention can be also achieved by an apparatus for reproducing information from the above mentioned optical disc of the present invention. The apparatus is provided with: a light irradiation device for irradiating a reproducing light onto the pit of the optical disc; a light detecting device having an N (N=8n; n=2, 3, 4, ...) divided light receiving surfaces for detecting the reproducing light, the N divided light receiving surfaces outputting light detection signals respectively; an optical system for guiding the reproducing light, which is reflected and diffracted by the pit, to the N divided light receiving surfaces; a computing device for computing and outputting information signal corresponding to the shape of the pit on the basis of the light detection signals of the N divided light receiving surfaces; and a reproduction device for identifying the shape of the pit in correspondence with the information signal and reproducing the information recorded on the optical disc.

According to the optical disc reproducing apparatus of the present invention, at first, a reproducing light is irradiated onto the pit of the optical disc. Then, the optical system is adjusted such that the reproducing light, which is reflected and diffracted by the pit, is perpendicularly incident onto the light detecting device having the N divided light receiving surfaces. Then, light detection signals are outputted by respectively converting the light, which is incident on the N divided light receiving surfaces, to electrical signals. Information signal corresponding to the shape of the pit are computed on the basis of the light detection signals. Finally, the shape of the pit is identified in correspondence with the information signal, and the recorded information is reproduced. In this manner, on the basis of the light detection signals from the N divided light receiving surfaces, the information signal corresponding to the shape of the pit can be computed to identify the shape of the pit, so that the record information can be reproduced from the optical disc of the present invention.

The above mentioned object of the present invention can be also achieved by a method of recording and reproducing the above mentioned optical disc of the present invention. The method is provided, in case of recording the information onto the optical disc, with the step of: recording information onto the optical disc by converting the information in a shape of the pit, the pit having one of a plurality of shapes comprising a combination of presence and absence of 4 pit pieces, each of the pit pieces being separated from each other and disposed outside of an area, which is approximately shaped in a X letter in the information unit and includes a unit center of the information unit. The method is also provided, in case of reproducing the information from the optical disc, with the steps of: irradiating a reproducing light onto the pit of the optical disc; guiding the reproducing light, which is reflected and diffracted by the pit, to an N (N=8n; n=2, 3, 4, . . . ) divided light receiving surfaces of a light detecting device; detecting the reproducing light by the N divided light receiving surfaces to output light detection signals respectively; computing and outputting information signal corresponding to the shape of the pit on the basis of the light detection signals of the N divided light receiving surfaces; and identifying the shape of the pit in correspondence with the information signal to reproduce the information recorded on the optical disc.

According to the recording and reproducing method of the present invention, the amount of recording information per unit area, can be increased. Namely, the information recording density of the optical disc can be increased, and the information reproduction can be performed in correspondence with the pit shape while reducing the influence of the positional offset.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.
First Embodiment A first embodiment of the present invention is a digital audio disc shown in FIGS. 1 to 4.

Figure 1A:
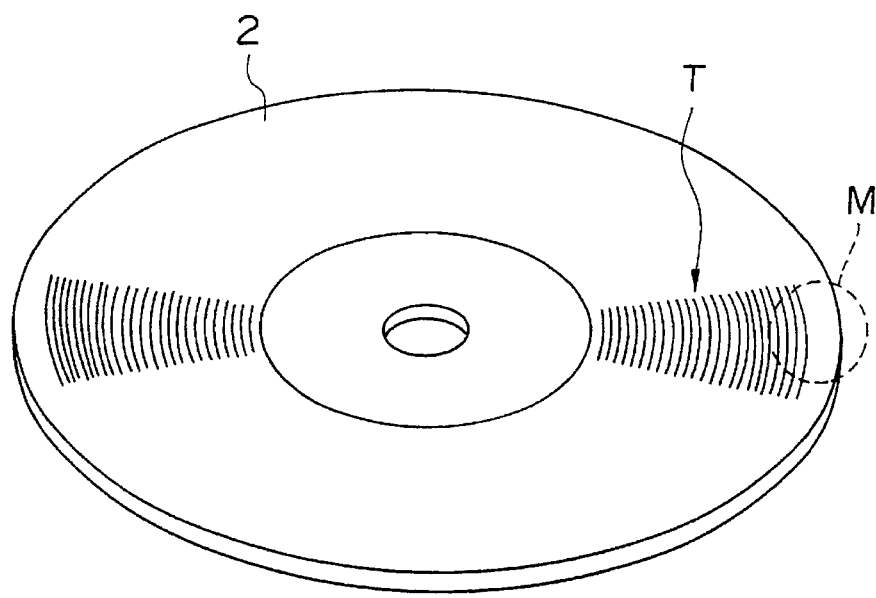
FIG. 1A is a perspective view of an optical disc as a first embodiment of the present invention.
Figure 1B:
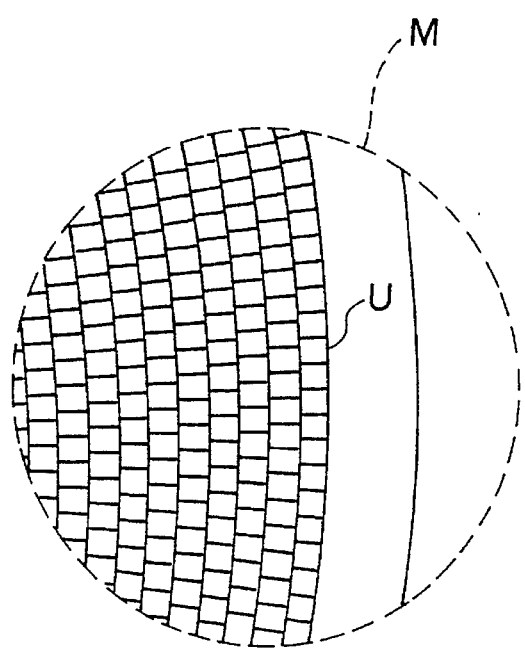
FIG. 1B is an enlarged plan view of the M portion of the optical disc of FIG. 1A.

FIG. 1A shows a perspective view of a digital audio disc 2 as the first embodiment. As shown in FIG. 1A, a track T in a spiral or coaxial shape is provided on the disc 2. FIG. 1B is an enlarged plan view of a M portion of the disc 2 in FIG. 1A. In FIG. 1B, a reference mark U represents an information unit.

Figure 2:
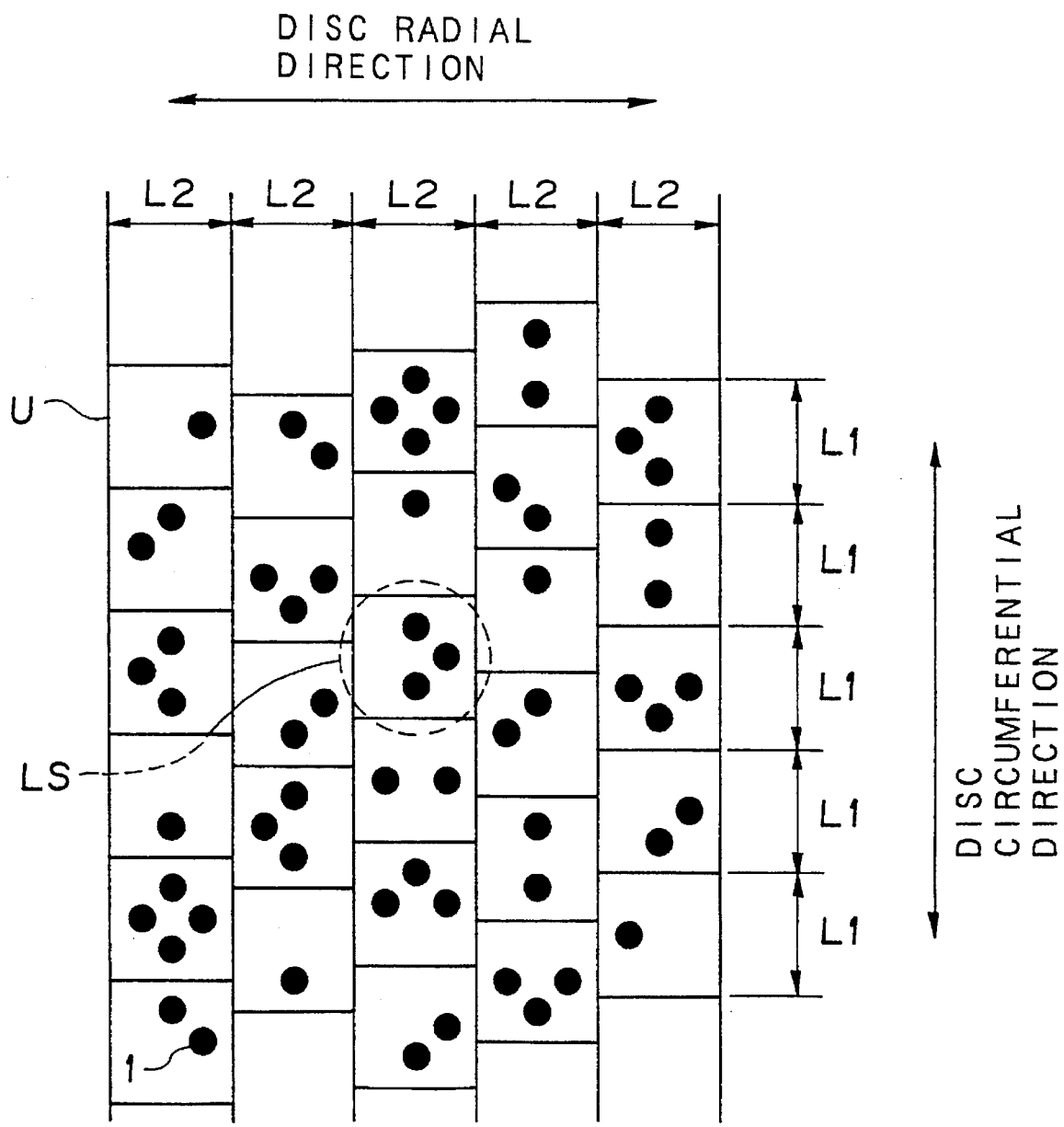
FIG. 2 is a diagram showing a construction of the first embodiment.

FIG. 2 is a further enlarged view of FIG. 1B. As shown in FIG. 2, a pit 1 is formed within the area of each information unit U, which has unit lengths L1 and L2 in the circumferential and radial directions of the disc respectively. In FIG. 2, a reference mark LS represents a laser beam spot, which is irradiated onto the disc when it is reproduced.

In FIG. 2, each information unit on one track and each information unit on another track which is adjacent to one track, are shifted to each other along the disc circumferential direction. However, each information unit on adjacent tracks may be aligned in the disc radial direction in the present invention as in another embodiment of FIGS. 8 and 9, which will be explained later.

Figure 3:
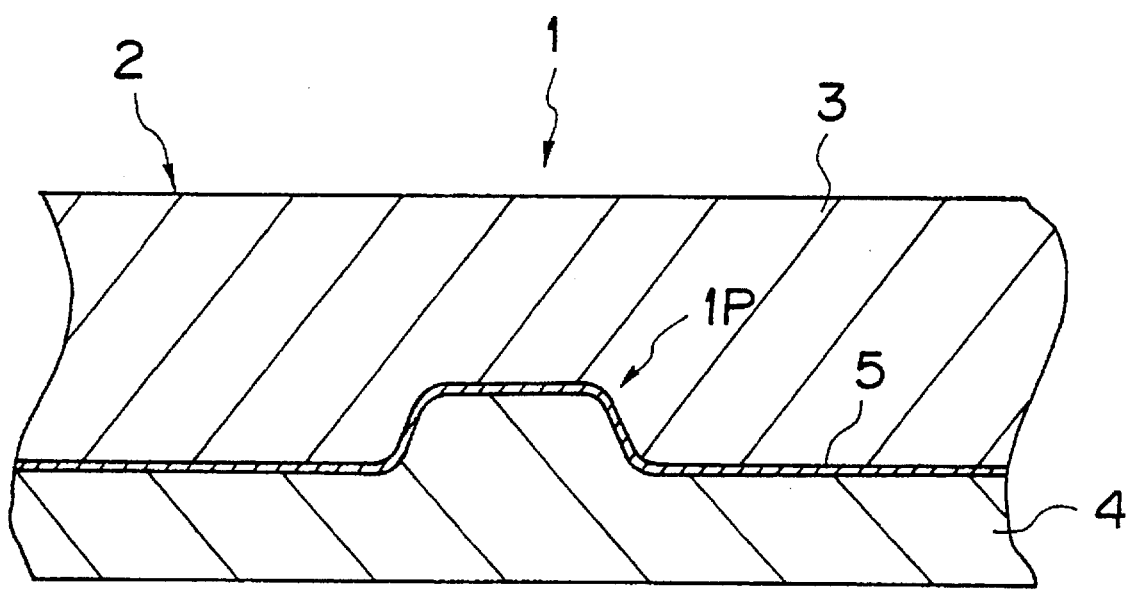
FIG. 3 is a partial sectional view of the first embodiment.

Nextly, as shown in a cross sectional view of FIG. 3, the disc 2 is provided with: a transparent substrate 3, which comprises polycarbonate resin etc.; an information recording surface 5, which is constructed by forming a pit 1 (in the upward direction or in the downward direction) on one surface of the substrate 3, and covering the pit and the plane surface other than the pit with a metal vapor deposition film of aluminum etc.; and a protection layer 4 covering the information recording surface 5. Here, the convex or concave portion formed by the metal vapor deposition film is a pit piece 1P.

Figure 4:
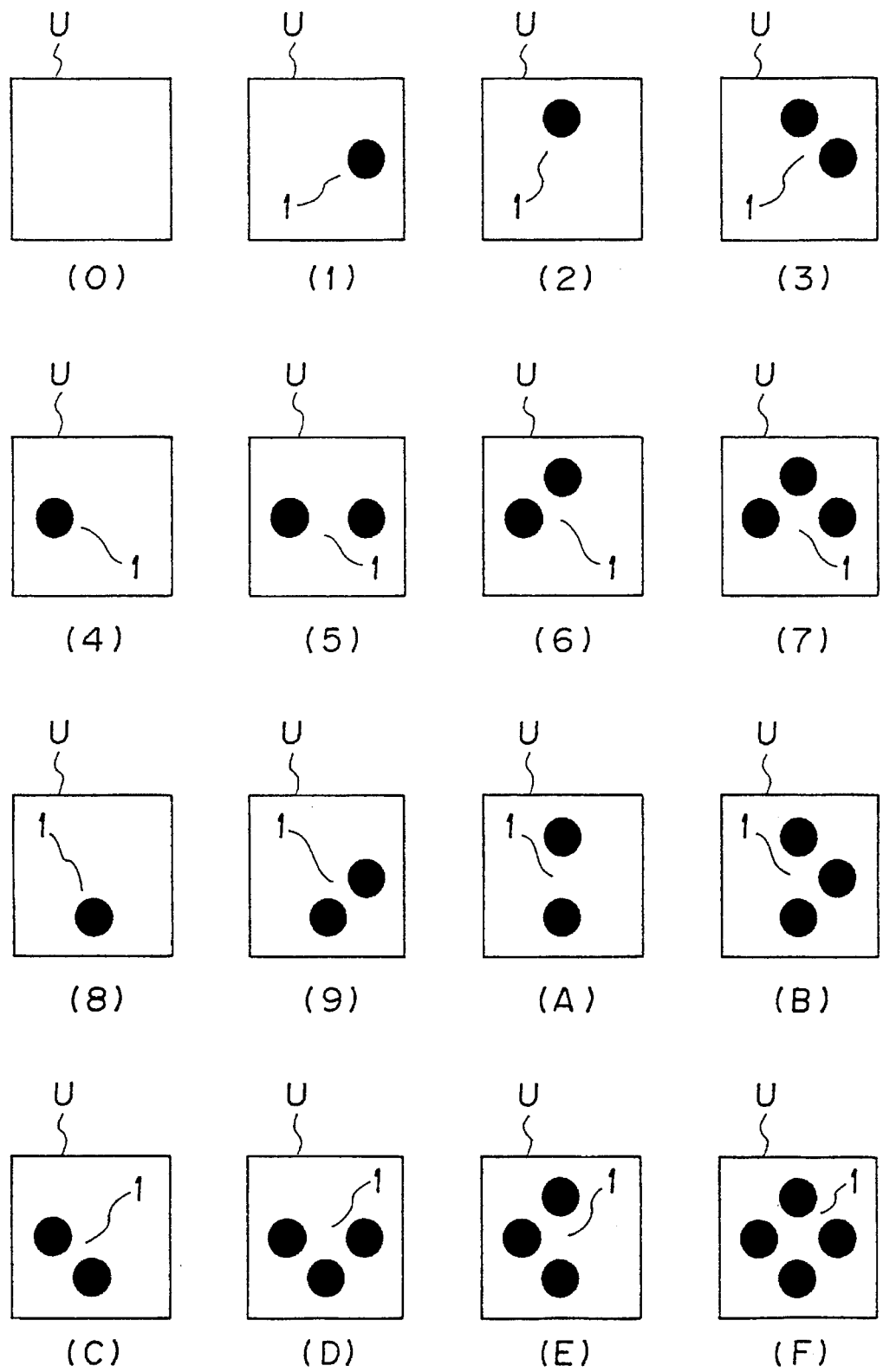
FIG. 4 is a diagram showing 16 pit patterns (O) to (F) in the first embodiment.

As the patterns of the pit 1, which is constructed by combining the pit pieces 1P, there are 16 pit patterns (O) to (F) as shown in FIG. 4.

In FIG. 4, each of the pit pieces is disposed in such a condition that the pit pieces are separated from each other and disposed outside of an area, which is approximately shaped in a X letter in the information unit and includes a unit center of the information unit (i.e. the area including the diagonal lines of the information unit). More particularly, in the present embodiment, the pit pieces are disposed in an area, which is approximately shaped in a cross, as easily understood from the pattern (F), in the information unit and includes the unit center of the information unit.

By virtue of the pit patterns of FIG. 4, the information having the information amount of 4 bits can be expressed per 1 pit.

Second Embodiment

Nextly, a second embodiment of the present invention, which is a digital audio disc player, will be explained with referring to FIG. 5.

Figure 5:
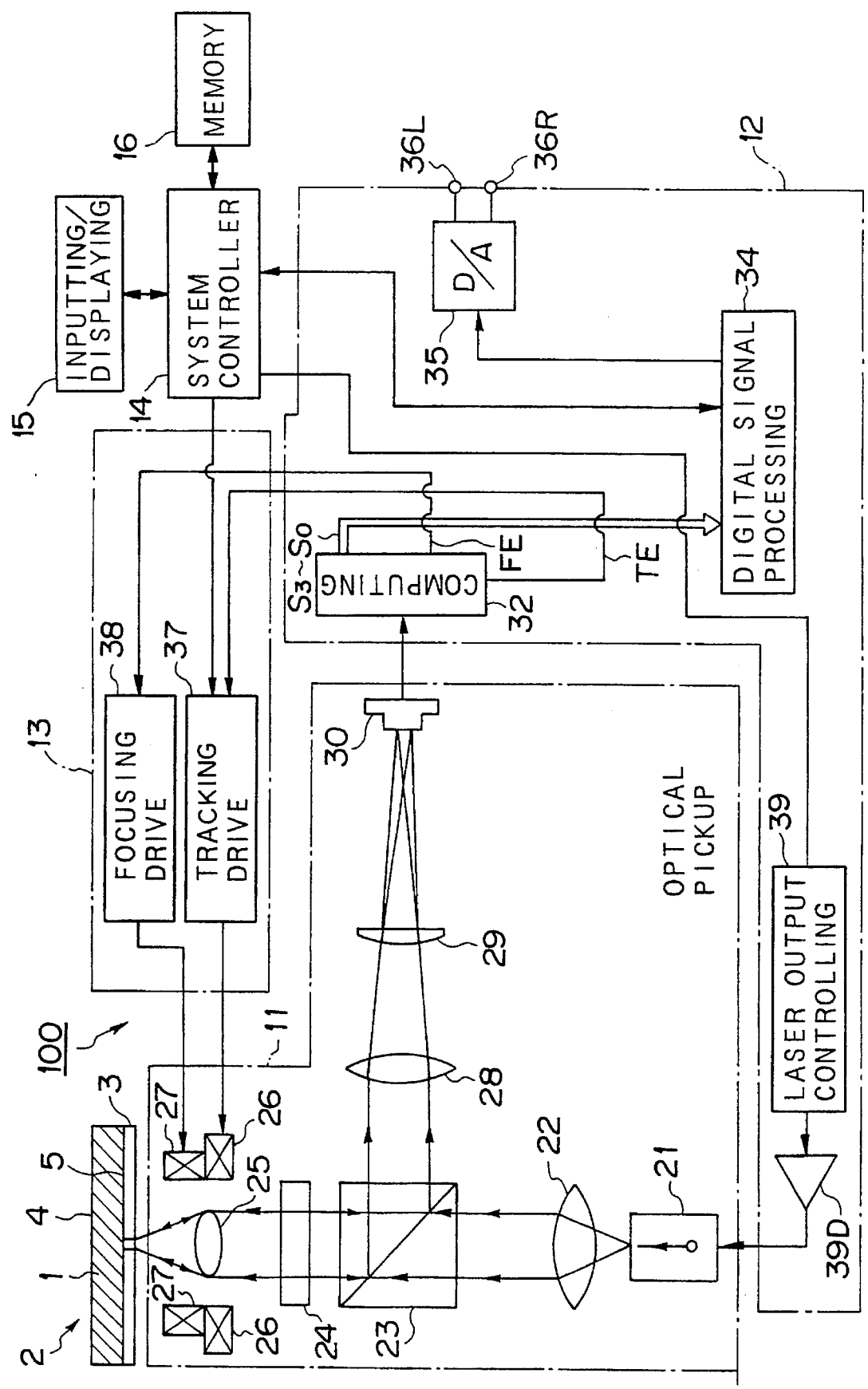
FIG. 5 is a block diagram of a digital audio disc player as a second embodiment of the present invention.

In FIG. 5, a digital audio disc player 100 is provided with: an optical pickup 11 for reading information form the digital audio disc (DAD) 2; a signal processing portion 12 for processing the read information signal; a pickup controlling portion 13 for controlling the optical pickup 11; a system controller 14 for controlling the player 100 on the whole; an inputting and displaying portion 15; and a memory portion 16.

The optical pickup 11 is provided with: a semiconductor laser 21 for generating and emitting a laser beam; a collimator lens 22 for converting the emitted laser beam to a collimated beam; a beam splitter 23 for transmitting the collimated beam; a ¼ wavelength plate 24 for changing the collimated beam, which is from the beam splitter 23, from the linear polarized beam to the circular polarized beam; an objective lens 25 for condensing the laser beam from the ¼ wavelength plate 24 onto the information recording surface 5 of the disc 2; a condensing lens 28 for condensing the reflected laser beam, which is reflected and diffracted at the reflection film 5, is transmitted through the objective lens 25 and the ¼ wavelength plate 24, and is bent in its optical path by a right angle at the reflection surface of the beam splitter 23; a cylindrical lens 29 for generating the astigmatism in the laser beam; and an 8 divided photodetector 30 for receiving the reflected laser beam transmitted through the cylindrical lens 29. Here, the laser beam is irradiated onto the digital audio disc 2 from the substrate side thereof.

The signal processing portion 12 is provided with: a computing circuit 32 for receiving the output signal of the 8 divided photodetector 30 and applying a predetermined computation to this output signal to output it; a digital signal processing circuit 34 for receiving one of the outputs of the computing circuit 32, applying a digital signal process to it and demodulating the information signal to output it; a D/A convertor 35 for modulating the digital output of the digital signal processing circuit 34 to an analog signal; output terminals 36L and 36R for outputting the output signal of the D/A convertor 35 to the external; a semiconductor laser driving circuit 39D for driving the semiconductor laser 21; and a laser output controlling circuit 39 for controlling the semiconductor laser driving circuit 39D.

The pickup controlling portion 13 is provided with: a tracking drive circuit 37 for receiving a tracking error signal TE which is the output from the computing circuit 32, and controlling a tracking actuator 26; and a focusing drive circuit 38 for controlling a focusing actuator 27 on the basis of a focus error signal FE which is another output of the computing circuit 32.

The system controller 14 controls the digital signal processing circuit 34, the tracking drive circuit 37 and the laser output controlling circuit 39 on the basis of the command from the inputting and displaying portion 15 etc., and sends data to and receives data from the memory portion 16.

Figure 6:
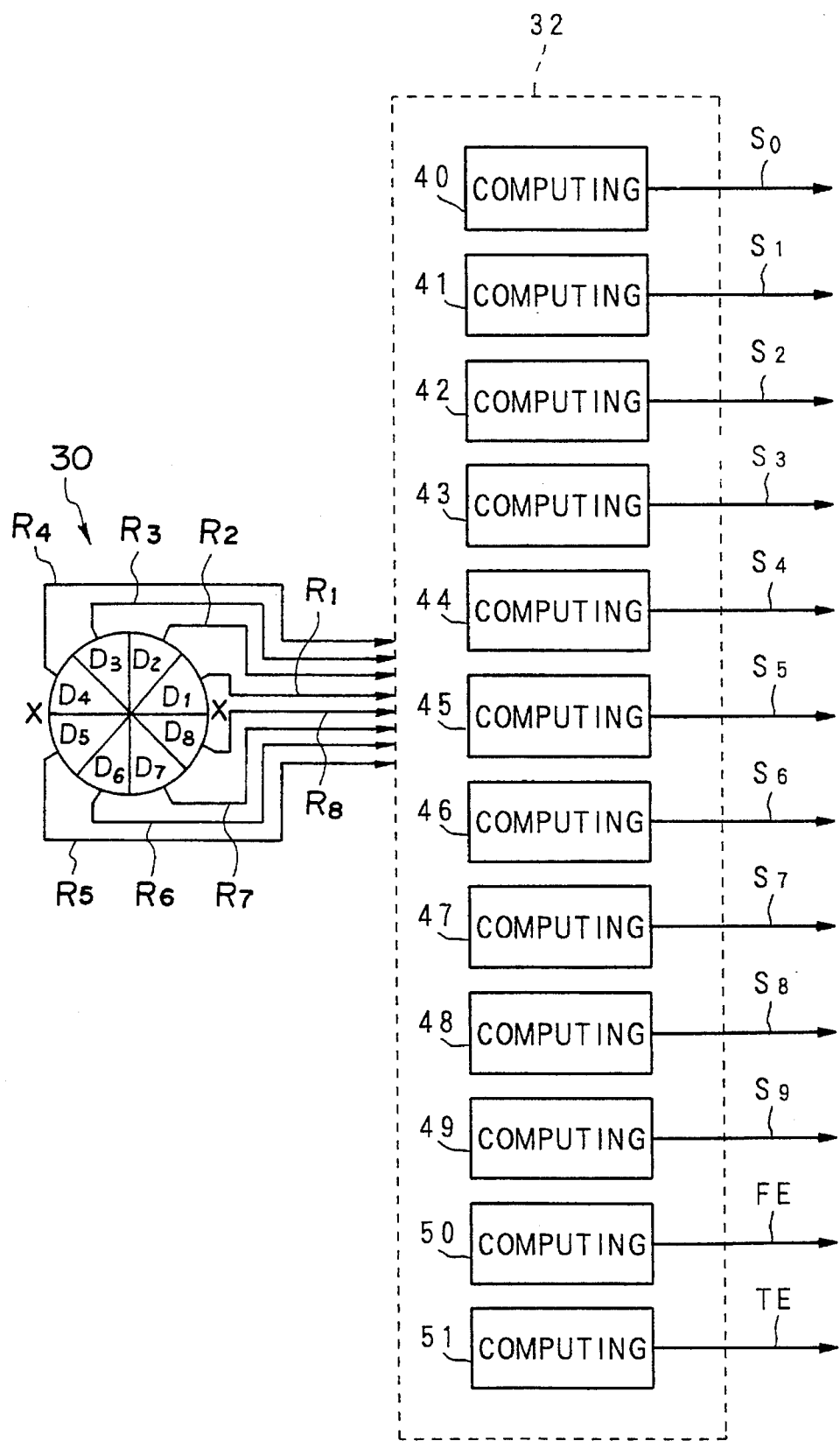
FIG. 6 is a block diagram of a light detecting device and a computing circuit in the second embodiment.

Nextly, more detailed constructions of the 8 divided photodetector 30 and the computing circuit 32 are shown in FIG. 6.

In FIG. 6, the 8 divided photodetector 30 has eight light receiving domains D1 to D8. The computing circuit 32 includes an information signal computing portions 40 to 49, a focus error signal computing portion 50 and a tracking error computing portion 51. In this case, from the information signal computing portions 40 to 49, information signals S0 to S9 are outputted. From the focus error computing portion 50, the focus error signal FE is outputted. From the tracking error computing portion 51, the tracking error signal TE is outputted. Here, the optical system is constructed such that the direction of the division line X—X of the 8 divided photodetector 30, is parallel with respect to the circumferential direction of the disc, and that, when the center of the laser beam spot from the objective lens is irradiated on the center line of one of the tracks, the center of the reflected laser beam spot coincides with the center of the 8 divided photodetector.

As shown in FIG. 6, from the 8 divided light receiving domains D1 to D8 of the 8 divided photodetector 30, the light detection signals R1 to R8 which are photoelectrically converted signals, are outputted and inputted to the information signal computing portions 40 to 49, the focus error signal computing portion 50 and the tracking error signal computing portion 51, respectively. Here, the information signal computing portion 40 outputs an information signal S0, which is expressed by a following expression (4).

$$S0=R1+R2+R3+R4+R5+R6+R7+R8 \quad (4)$$

The information signal computing portion 41 outputs an information signal S1, which is expressed by a following expression (5).

$$S1=|(R1+R2+R3+R4)-(R5+R6+R7+R8)| \quad (5)$$

In the same manner, each of the information signal computing portions 42 to 49 output information signals S2 to S9 which are expressed by following expressions (6) to (13), respectively.

$$S2=|(R2+R3+R4+R5)-(R6+R7+R8+R1)| \quad (6)$$

$$S3=|(R3+R4+R5+R6)-(R7+R8+R1+R2)| \quad (7)$$

$$S4=|(R4+R5+R6+R7)-(R8+R1+R2+R3)| \quad (8)$$

$$S5=(R7+R8+R1+R2)-(R3+R4+R5+R6) \quad (9)$$

$$S6=(R8+R1+R2+R3)-(R4+R5+R6+R7) \quad (10)$$

$$S7=(R1+R2+R3+R4)-(R5+R6+R7+R8) \quad (11)$$

$$S8=(R2+R3+R4+R5)-(R6+R7+R8+R1) \quad (12)$$

$$S9=(R8+R1+R4+R5)-(R2+R3+R6+R7) \quad (13)$$

Further, the focus error signal computing portion 50 and the tracking error signal computing portion 51 output the focus error signal FE and the tracking error signal TE, which are expressed by following expressions (14) and (15), respectively.

$$FE=(R1+R2+R5+R6)-(R3+R4+R7+R8) \quad (14)$$

$$TE=(R1+R2+R3+R4)-(R5+R6+R7+R8) \quad (15)$$

Nextly, it will be explained how to identify the 16 pit patterns (O) to (F) of FIG. 4, from the information signals S0 to S9 computed by the expressions (4) to (13) respectively, by use of the light detection signal R1 to R8.

Figure 7:
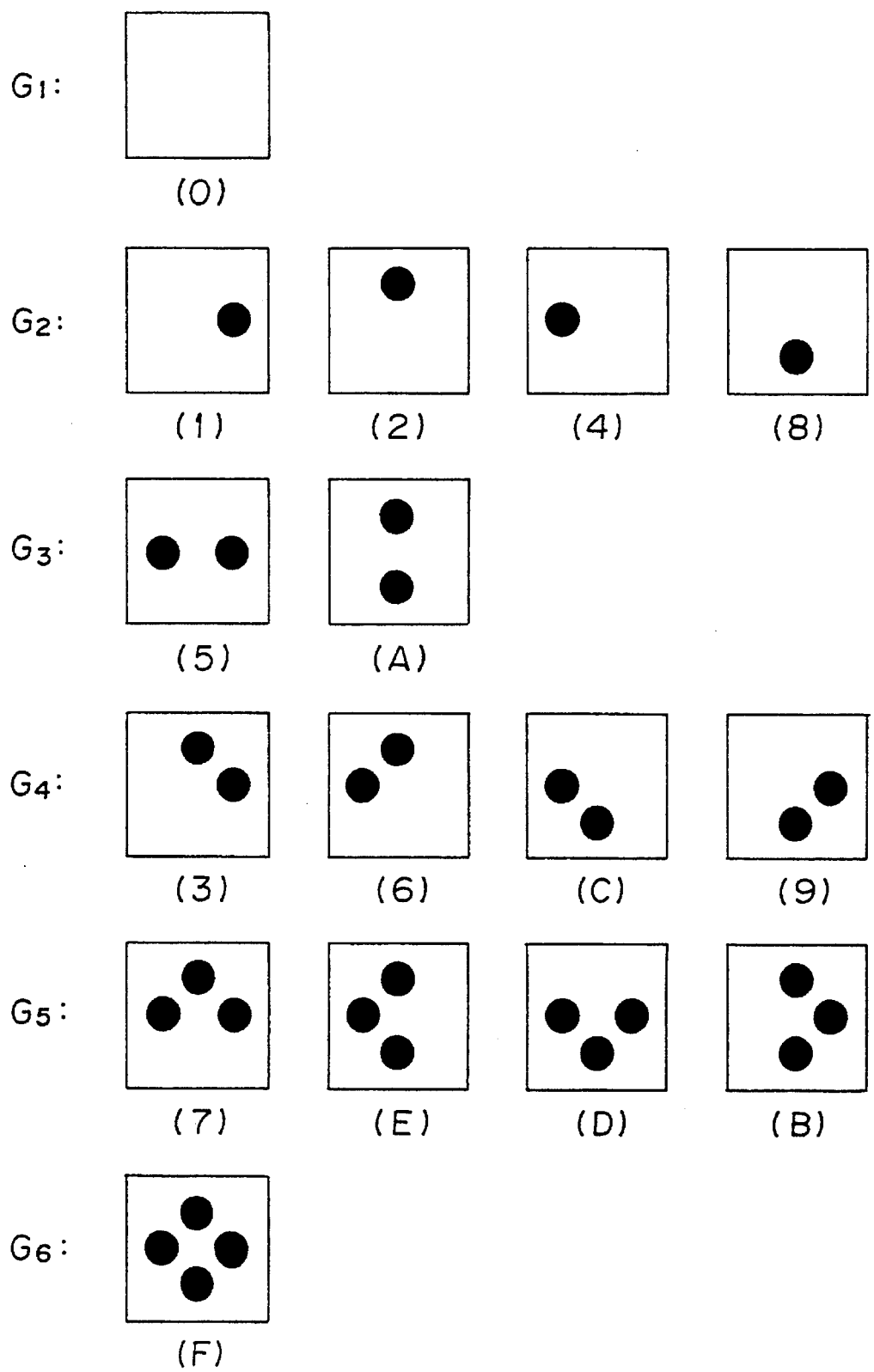
FIG. 7 is a diagram showing 16 pit patterns (O) to (F) classified into groups G1 to G6 in the second embodiment.

Firstly, the 16 pit patterns (O) to (F), can be classified into 6 groups G1 to G6 by the number and the arrangement of the pit pieces, as shown in FIG. 7. Since the reflection light intensity of the light from the pit is different from group to group, it can be identified or recognized which group the pit belongs to, by cutting off the information signal S0 by an appropriate size (step S1). If it is the group G1 or the group G6, since there exists only one type of pit pattern in each group respectively, the pit pattern identification i.e. the pit shape identification can be completed just by this step S1.

Nextly, it will be explained as for the identification of the pit patterns (5) and (A), which belong to the group G3. In this case, by the procedure of the above explained step S1, the group is identified at first. Then, by checking the sign of the information signal S9, the pit shape is identified (step S2). Namely, if S9>0, it is identified as the pit pattern (5). If S9<0, it is identified as the pit pattern (A).

Nextly, it will be explained how to identify the 4 pit patterns which belong to the group G2. In this case, in the same manner as the case of the group G3, the group is firstly identified by the procedure of the step S1. Then, the large or small relationship between the information signal S1 and the information signal S3, and the signs of the information signals S5 and S7, are checked (step S3).

As a result, if S1<S3 and S5>0, it is identified as the pit pattern (1). If S1<S3 and S5<0, it is identified as the pit pattern (4). If S1>S3 and S7>0, it is identified as the pit pattern (2). If S1>S3 and S7<0, it is identified as the pit pattern (8).

The identification of the pit patterns in the group G5 is performed in the same procedure as the case of the group G2.

The identification of the pit patterns in the group G4, can be performed in the similar manner, by use of the information signals S2, S4, S6 and S8 instead of the information signals S1, S2, S3 and S7 used in the case of group G2.

Figure 8B:
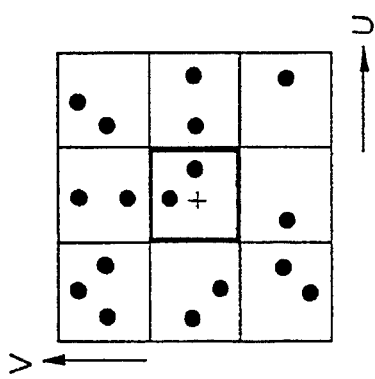
FIG. 8B is a diagram showing the arrangement of the pit pieces used for obtaining the light intensity distributions of FIG. 8A.
Figure 8A:
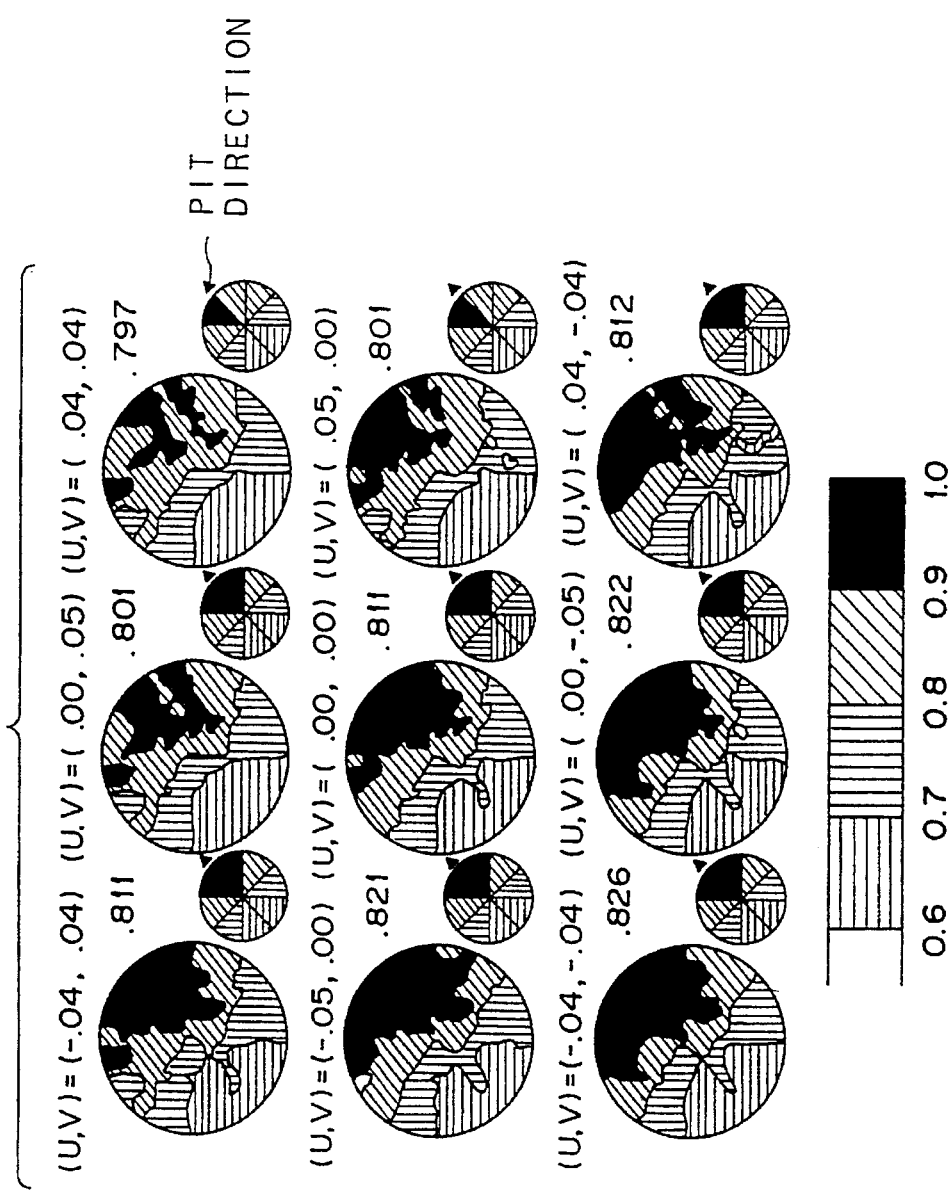
FIG. 8A is a diagram showing light intensity distributions of the light detecting device in the second embodiment when the pit pieces are arranged distant from each other as shown in FIG. 8B.
Figure 9B:
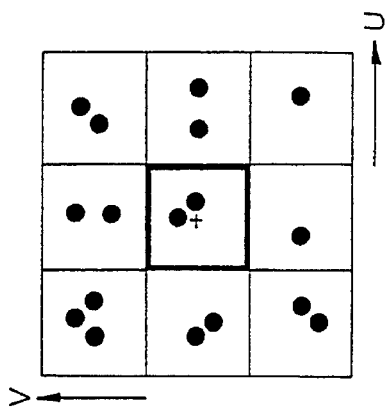
FIG. 9B is a diagram showing the arrangement of the pit pieces used for obtaining the light intensity distributions of FIG. 9A.
Figure 9A:
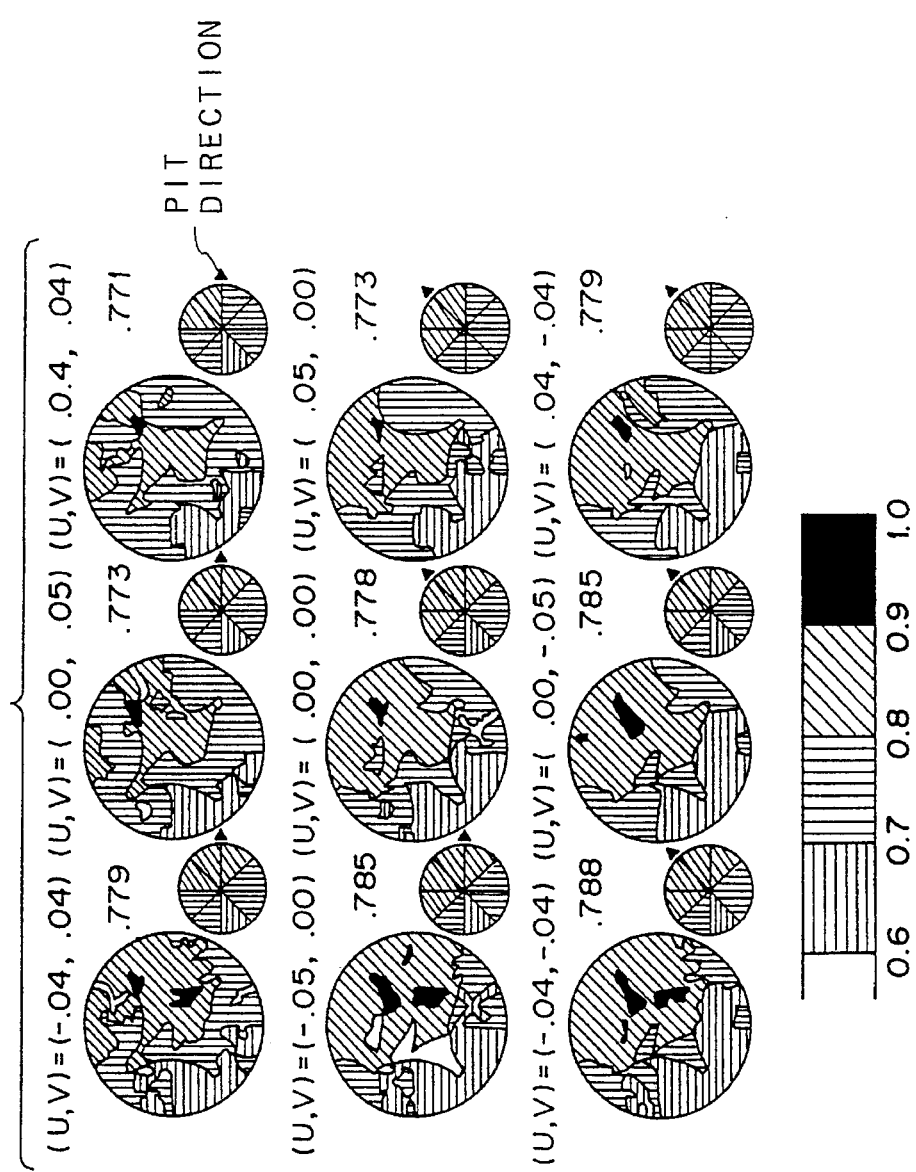
FIG. 9A is a diagram showing light intensity distributions of the light detecting device in the second embodiment when the pit pieces are arranged near to each other as shown in FIG. 9B.

Nextly, it will be explained the case where the pits having voluntary pit patterns are arranged around the pit to be identified, with referring to FIGS. 8 and 9. Here, FIG. 8A showings light intensity distributions when the pit pieces are arranged distant from each other as shown in FIG. 8B. FIG. 9A shows light intensity distributions when the pit pieces are arranged close to each other as shown in FIG. 9B. In each of FIGS. 8B and 9B, the pit to be identified is indicated by a thick line frame at the center of the figure. It is assumed that the center of the information unit is offset or shifted from the center of the laser beam spot. The light intensity distributions of the photodetector and the identification results in each cases, are shown in FIG. 8A and 9A, respectively.

If the pit pieces are disposed very close to each other as shown in FIG. 9B, it is understood from FIG. 9A that there is relatively high possibility of erroneous detection depending on the offset direction. On the contrary, if the pit pieces are disposed distant from each other with an appropriate distance as shown in FIG. 8B, it is understood from FIG. 8A that the detection accuracy can be improved. In this case, since the size of the information unit is about $1.2 \times 1.2$ $\mu m^2$, and the pit shape has 16 patterns, the information recording density is improved to be about 2.5 times as high as the conventional CD.

The above explained method of identifying the pit patterns is only one example, and it is possible to identify the 16 pit patterns by use of another computing method or another pattern recognition method.

Third Embodiment

Figure 10:
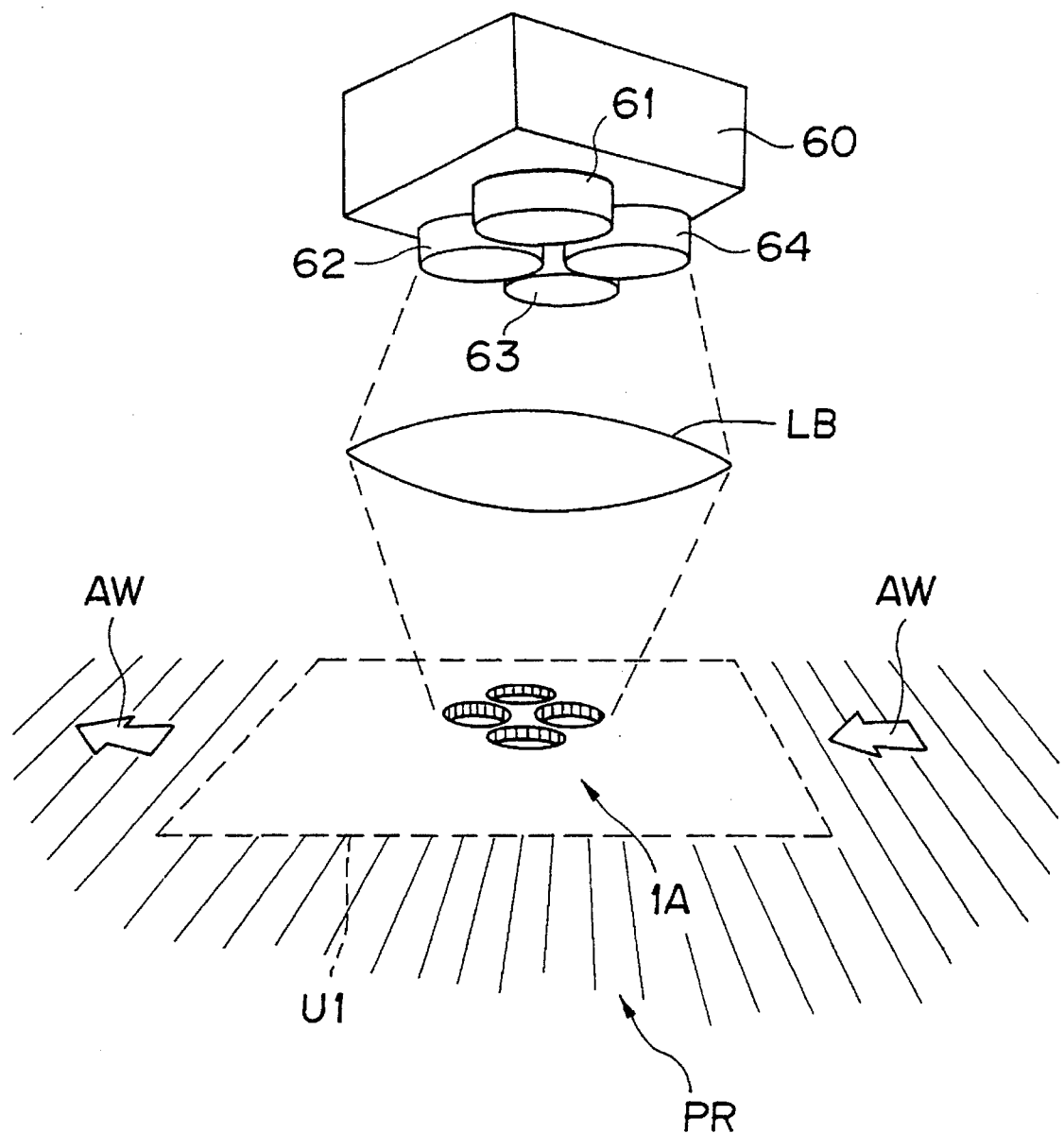
FIG. 10 is a diagram showing one example of a mastering method of the optical disc according to the present invention.
Figure 11:
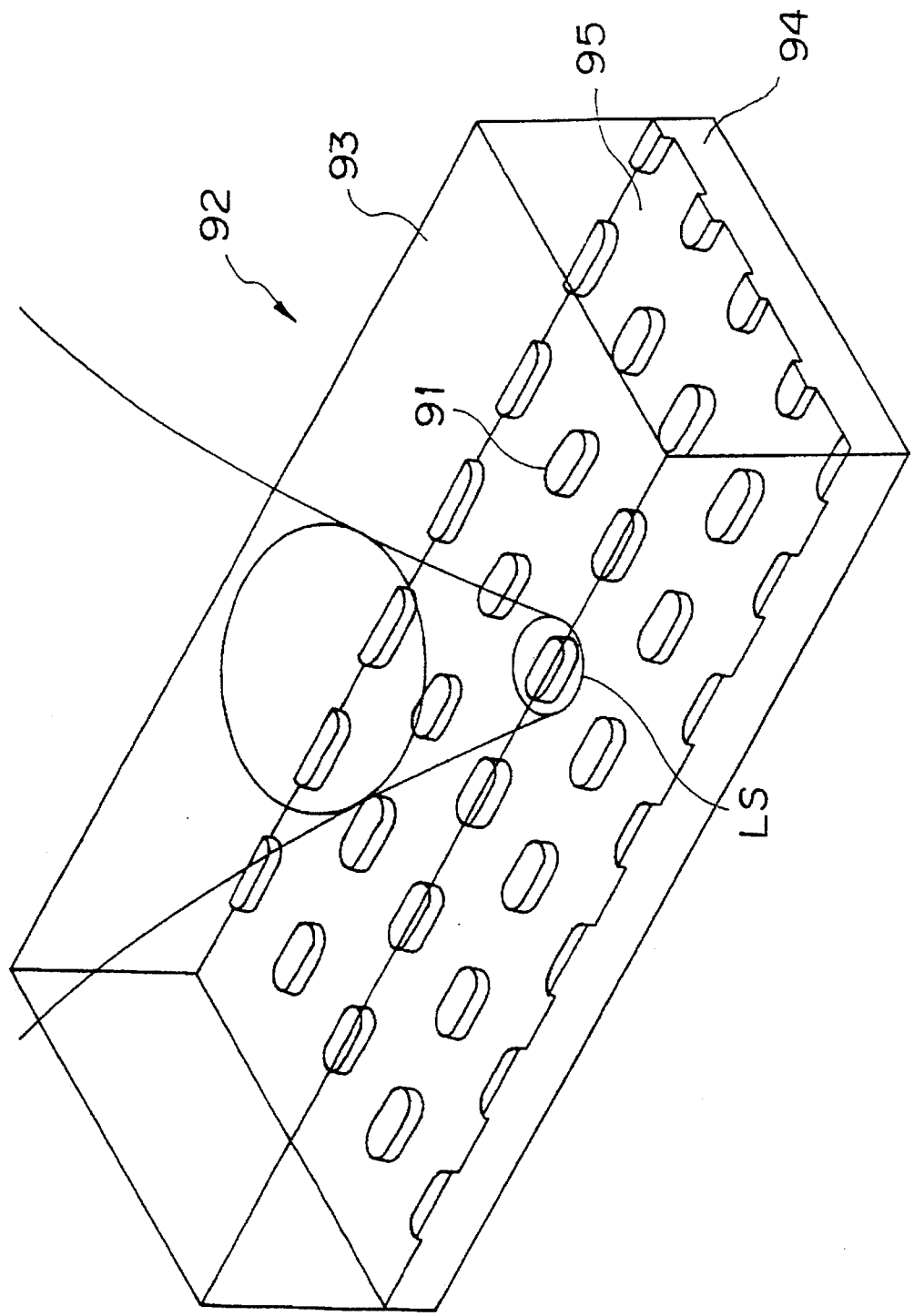
FIG. 11 is a partial perspective view showing the construction of the optical disc according to the related art.
Figure 12:
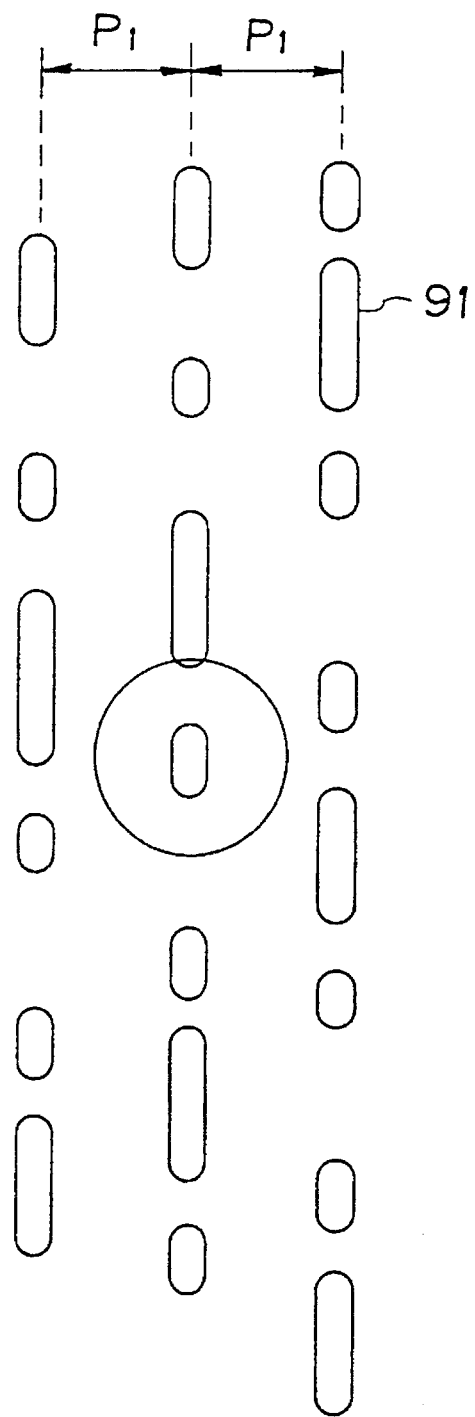
FIG. 12 is a diagram for explaining a track pitch of the optical disc of FIG. 11.

As a mastering method (i.e. a method of producing a master disc) to produce the optical disc having the pit shape of the present invention, there is one method as shown in FIG. 10. In this method, a photoresist film PR is coated on a glass original disc to have an optimum film thickness. Then, the laser beam LB, which is moved in the direction indicated by arrows AW by an optical head 60 having four semiconductor lasers 61 to 64, is irradiated onto the glass original disc to expose it, so that an information pit 1A composed of 4 pit pieces is obtained in the information unit U1. In this case, even if the shapes of four pit pieces are not exactly coincident to each other, there arises no problem in reading the pit signal.

In the above embodiments, the explanations have been made with respect to the digital audio disc as an optical disc. However, other types of optical disc are available as long as the optical disc employs the digital format.

Further, the information pit can be in the convex form or the concave form with respect to the incident laser beam.

Furthermore, in the above embodiments, the 8 divided photodetector is used as the photodetector. However, the same advantageous effect of the present invention can be obtained by use of an N (N=8n; n=2, 3, 4, . . . ) divided photodetector, in place of the 8 divided photodetector.

As described above in detail, according to the first embodiment, by use of the combination of the presence and absence of four pit pieces, one pit can express 16 types of information (corresponding to 4 bits). Further, each of the pit pieces is disposed in such a condition that they are distant from each other and disposed outside the approximately x shaped area, which includes the unit center i.e. the center of the information unit. Thus, even if the center of the information unit and the center of the beam spot are offset or shifted to each other, the possibility of the erroneous detection can be diminished.

According to the second embodiment, the pit shape can de identified and the recording information can be reproduced, by computing the information signal corresponding to the pit shape while reducing the influence of the positional offset of the irradiation position of the reproducing beam, on the basis of the light detection signal from each light receiving domain of the light detecting device which has an N divided light receiving domains.

According to the third embodiment, the information amount per a unit area can be increased, so that the recording density of the optical disc can be increased, and that the information reproduction corresponding to the pit shape can be performed while reducing the influence of the positional offset of the irradiation point of the reproducing beam.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disc comprising:

a disc substrate having a disc shape;

a recording surface formed on said disc substrate and having a spiral or coaxial track with a predetermined track pitch;

a plurality of information units formed on said track, each of which has a predetermined unit length in a circumferential direction and a radial direction of said optical disc respectively; and a pit formed in each of said information units, for recording information by converting the information in a shape of said pit, said pit having one of a plurality of shapes comprising a combination of presence and absence of 4 pit pieces, each of the pit pieces being separated from each other and disposed outside of an area, which is approximately shaped in a X letter in said information unit and includes a unit center of said information unit.

2. An optical disc according to claim 1, wherein the pit piece has one of a concave shape and a convex shape with respect to a reproducing light to reproduce said optical disc.

3. An optical disc according to claim 1, wherein the pit pieces are disposed in an area, which is approximately shaped in a cross in said information unit and includes the unit center of said information unit.

4. An optical disc according to claim 1, wherein each information unit on one track and each information unit on another track which is adjacent to said one track, are shifted to each other along the circumferential direction.

5. An optical disc according to claim 1, wherein each information unit on one track and each information unit on another track which is adjacent to said one track, are aligned in the radial direction.

6. An apparatus for reproducing information from an optical disc, said optical disc comprising: a disc substrate having a disc shape; a recording surface formed on said disc substrate and having a spiral or coaxial track with a predetermined track pitch; a plurality of information units formed on said track, each of which has a predetermined unit length in a circumferential direction and a radial direction of said optical disc respectively; and a pit formed in each of said information units, for recording the information by converting the information in a shape of said pit, said pit having one of a plurality of shapes comprising a combination of presence and absence of 4 pit pieces, each of the pit pieces being separated from each other and disposed outside of an area, which is approximately shaped in a X letter in said information unit and includes a unit center of said information unit, said apparatus comprising:

a light irradiation means for irradiating a reproducing light onto said pit of said optical disc;

a light detecting means having an N (N=8n; n=2, 3, 4, . . . ) divided light receiving surfaces for detecting the reproducing light, said N divided light receiving surfaces outputting light detection signals respectively;

an optical system for guiding the reproducing light, which is reflected and diffracted by said pit, to said N divided light receiving surfaces;

a computing means for computing and outputting information signal corresponding to the shape of said pit on the basis of the light detection signals of said N divided light receiving surfaces; and a reproduction means for identifying the shape of said pit in correspondence with the information signal and reproducing the information recorded on the optical disc.

7. An apparatus according to claim 6, wherein said computing means computes a focusing error signal and a tracking error signal on the basis of the light detection signals.

8. A method of recording and reproducing an optical disc, said optical disc comprising: a disc substrate having a disc shape; a recording surface formed on said disc substrate and having a spiral or coaxial track with a predetermined track pitch; a plurality of information units formed on said track, each of which has a predetermined unit length in a circumferential direction and a radial direction of said optical disc respectively; and a pit formed in each of said information units, said method comprising the steps of:

recording information onto said optical disc by converting the information in a shape of said pit, said pit having one of a plurality of shapes comprising a combination of presence and absence of 4 pit pieces, each of the pit pieces being separated from each other and disposed outside of an area, which is approximately shaped in a X letter in said information unit and includes a unit center of said information unit;

irradiating a reproducing light onto said pit of said optical disc;

guiding the reproducing light, which is reflected and diffracted by said pit, to an N (N=8n; n=2, 3, 4, . . . ) divided light receiving surfaces of a light detecting means;

detecting the reproducing light by said N divided light receiving surfaces to output light detection signals respectively;

computing and outputting information signal corresponding to the shape of said pit on the basis of the light detection signals of said N divided light receiving surfaces; and identifying the shape of said pit in correspondence with the information signal to reproduce the information recorded on the optical disc.

9. A method according to claim 8, further comprising the step of computing a focusing error signal and a tracking error signal on the basis of the light detection signals.

10. A method according to claim 8, wherein said recording step comprises the step of irradiating 4 laser beams to form 4 pit pieces respectively.

* * * * *